United States Patent Office 3,787,521
Patented Jan. 22, 1974

3,787,521
METHOD OF PREPARING A POWDER COATING COMPOSITION CONTAINING GLYCIDYL ACRYLATE COPOLYMERS AND DICARBOXYLIC ACID CROSSLINKING AGENT
Santokh S. Labana, Dearborn Heights, and Amos Golovoy, Westland, Mich., assignors to Ford Motor Company, Dearborn, Mich.
No Drawing. Filed Feb. 22, 1971, Ser. No. 228,262
Int. Cl. C08g 45/04
U.S. Cl. 260—836  4 Claims

ABSTRACT OF THE DISCLOSURE

A powder coating composition whose principal ingredients are (a) a copolymer of glycidyl acrylate or glycidyl methacrylate and an ethylenically unsaturated compound, (b) a dicarboxylic acid cross linking agent, and (c) other suitable materials such as a pigment, a flow control agent, a catalyst and such, is manufactured by a process which includes the following general steps. A solution of the copolymer in a solvent is prepared. A solution of the dicarboxylic acid in an alcohol having a boiling point in the range of 60° C. to 120° C. is also prepared. The alcohol acts as a solvent for the acid. The copolymer solution is mixed with the dicarboxylic acid solution to form an intermediate solution. The other suitable materials for the powder coating composition are mixed with the intermediate solution to form a final solution. The solvents are evaporated from the final solution to form the powder coating composition.

BACKGROUND OF THE INVENTION

The background of this invention is best understood by making reference to U.S. patent application Ser. No. 172,236, filed Aug. 16, 1971 for Powder Coating Compositions, hereinafter referred to as the prior application. This prior application is filed on behalf of Santokh S. Labana and is assigned to the Ford Motor Company, Incorporated, the assignee of this application. The specification of the prior application Ser. No. 172,236 is incorporated by reference into this specification and is made a part hereof.

The prior application is directed to powder coating compositions containing dicarboxylic acid cross linking agents. In particular, the prior application teaches powder coating compositions wherein the principal ingredients are (a) a copolymer of glycidyl acrylate or glycidyl methacrylate and an ethylenically unsaturated compound, (b) a saturated, straight chain, aliphatic, dicarboxylic acid cross linking agent, and (c) other materials used to form a powder coating composition such as a flow control agent, a pigment, an antistatic agent, a catalyst and such. The prior application teaches all of the various materials employed in such powder coating compositions and teaches the specific glass transition temperatures and the molecular weight ranges for the materials such as the copolymers utilized in the powder coating composition. Since all of the disclosure of the prior application is included herein by reference, no detail discussion of the principal ingredients of such powder coating compositions will be undertaken herein.

The present application discloses a different method of compounding individual powder coating compositions than the method taught in the prior application. This new method involves the formation of the powder coating composition from a solution rather than the formation of such a coating from dry materials. The formation of the powder coating in either manner results in a powder coating composition which produces a coating having superior surface characteristics, high gloss and a rich finish.

The powder coating composition dealt with in this application is a coating composed generally of the following ingredients: a prepolymer, a dicarboxylic acid cross linking agent, a pigment, a flow control agent, an anti-static agent and a catalyst. As is stated in the prior application, good coatings can be obtained when these ingredients, in a dry state, are thoroughly mixed with one another in a single operation.

It is an object of this invention to provide a method for preparing powder coating compositions containing a dicarboxylic acid cross linking agent from solution. It is another object of this invention to provide a method of preparing powder coating compositions containing dicarboxylic acid cross linking agents on commercially available paint formulating equipment which handles such paint formulations while in solution. It is a further object of this invention to provide a method of preparing a powder coating composition containing a dicarboxylic acid cross linking agent in which all of the materials thereof are uniformly dispersed throughout the entire powder coating composition and which produces a coated surface of high gloss and excellent appearances.

SUMMARY OF THE INVENTION

This invention is directed to a method of preparing a powder coating composition and, more particularly, to a method of preparing a powder coating composition from a solution wherein the principal ingredients of the composition are (a) a copolymer of glycidyl acrylate or glycidyl methacrylate and an ethylenically unsaturated compound, (b) a dicarboxylic acid cross linking agent, and (c) other materials used to form the powder coating composition such as a flow control agent, a pigment, an antistatic agent, a catalyst and such. In its broadest form, the invention teaches the solution of the dicarboxylic acid in an alcohol having a boiling point in the range of 60° C. to 120° C. prior to the addition of the dicarboxylic acid to a solution of the copolymer in a suitable solvent.

In accordance with the general teaching of this invention, the following steps are carried out to prepare a powder coating composition. The copolymer is dissolved in a suitable solvent to form a solution. The dicarboxylic acid cross linking agent is dissolved in an alcohol having a boiling point in the range of 60° C. to 120° C. to prepare a solution of the acid. The copolymer solution is mixed with the dicarboxylic acid solution to form an intermediate solution. The other suitable materials for the powder coating composition are mixed with the intermediate solution to form a final solution. The solvents are evaporated from the final solution to produce the final material for the powder coating composition. Any known method for evaporating a solvent to recover solids from a solution are applicable. These methds include vacuum drying, spray drying, flash drying, evaporation of solvent in a devolatilizing extruder and air drying.

In greater detail, the copolymer solution generally contains 30% to 50% by weight of the copolymer. Also, the alcohol is present in the dicarboxylic acid solution in the range from about 15% to about 50% by weight of the total solvents in both the copolymer solution and the dicarboxylic acid solution.

As an alternate approach, the other suitable materials for the powder coating composition may be mixed with the dicarboxylic acid solution prior to the mixing of the dicarboxylic acid solution with the copolymer solution. Also, the other suitable materials may be mixed with the copolymer solution prior to the mixing of the dicarboxylic acid solution with the copolymer solution.

DESCRIPTION OF THE PREFERRED EMBODIMENT

A general discussion of the various materials which are employed to form powder coating compositions of the type mentioned above are thoroughly discussed in the prior application Ser. No. 172,236, filed Aug. 16, 1971. The powder coating compositions discussed in this application are the same as discussed in the prior application and they contain the following principal ingredients. A copolymer is formed of glycidyl acrylate or glycidyl methacrylate and an ethylenically unsaturated compound. Such a copolymer has a glass transition temperature in the range of 40° C. to 90° C. and a molecular weight ($\overline{M}_n$) in the range of 2500 to 8500. The glycidyl acrylate or glycidyl methacrylate is generally found in the final copolymer from at least about 8% by weight to no more than about 25% by weight. In general, the dicarboxylic acid is a straight chain, aliphatic, dicarboxylic acid having 4 to 20 carbon atoms per molecule. This dicarboxylic acid is present in the powder coating composition in the amount of 0.8 to 1.1 carboxylic groups per each epoxy group in the copolymer. The desirable acids are adipic acid, pimelic acid, suberic acid, azelaic acid, sebacic acid, undecandoic acid, and brassylic acid.

The other materials used to form an individual powder coating composition are a flow control agent, a pigment, an anti-static agent, a catalyst and such. These materials are fully discussed in the prior application and reference thereto is made for a complete discussion thereof. The flow control agent generally forms from 0.05% to 4.0% by weight of an individual powder coating composition. A catalyst in the range from 0.1% to 1.0% by weight is used in such a powder coating composition. An anti-static agent is included in the composition in the range from 0.1% to 1.0% by weight. Pigments are included in each of the compositions from about 6% to about 35% by weight depending upon the pigment used.

Suitable solvents for the copolymer are generally such materials as benzene, toluene and xylene. The alcohols which may be employed for dissolving the dicarboxylic acid may be any one of the following: methanol, ethanol, propanol, isopropanol, butanol, isobutanol, sec-butyl alcohol, and tert-butyl alcohol.

Having generally described the various materials which are employed in formulating the powder coating compositions, a plurality of examples will be set forth to illustrate the various methods of preparing the powder coating composition in accordance with the teachings of this invention.

Example 1

The monomers, glycidyl methacrylate 15% by weight, methyl methacrylate 45% by weight and butyl methacrylate 40% by weight are mixed together. Three weight percent of a catalyst 2,2'-azobis-(2-methylpropionitrile) (AIBN) is dissolved in the monomer mixture. The mixture, 30 parts by weight, is slowly added to refluxing toluene (70 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°–112° C.) with only a small fraction of heat supplied from an external heater. After the addition of the monomer mixture is complete, the refluxing is maintained by external heat source for 3 additional hours. This action produces a copolymer solution in toluene containing 30% by weight solid copolymer. The copolymer has a glass transition temperature of 53° C. and a molecular weight ($\overline{M}_n$) of 4000.

The dicarboxylic acid solution in alcohol is prepared in the following manner: A quantity of 10 parts by weight of azelaic acid is added to 100 parts by weight of methanol and the mixture is stirred vigorously for about 10 minutes until the acid is completely dissolved in the alcohol. One hundred and ten parts by weight of the dicarboxylic acid solution is added to 333 parts by weight of the copolymer solution and the mixture is stirred for 5 minutes to obtain a clear homogeneous intermediate solution of copolymer, azelaic acid, toluene, and methanol.

Thereafter, 0.2 part by weight of tert-butyl ammonium bromide, 0.5 part polylauryl acrylate ($\overline{M}_n = 10,000$), and 30 parts titanium dioxide is mixed with the intermediate solution formed of the copolymer solution and the dicarboxylic acid solution thereby to form a final solution.

The solution is poured into shallow trays and placed in vacuum oven at 30° to 50° C. to remove the solvents. Drying is continued for 24 hours to give a solid product containing less than 3% by weight of solvents. The solid obtained is ground in a ball mill to a fine powder to pass through 140 mesh screen.

The resulting powder thus obtained is a powder coating composition formulated in accordance with the method of this invention. The powder is sprayed on an electrically grounded, steel panel by using an electrostatic powder spray gun operating at 50 kv. charging voltage. After spraying, the panel is heated at 175° C. for 20 minutes. The coating obtained on the panel has good adhesion and good impact strength. The coating also is applied to and has good adhesion on panels of glass, brass, zinc, aluminum, copper and bronze. The coating obtained is not soluble in toluene, gasoline, butanone or methanol.

Example 2

The procedure of Example 1 is repeated. The formation of the copolymer, however, begins with a monomer mixture having glycidyl methacrylate 8% by weight, methyl methacrylate 52% by weight and butyl methacrylate 40% by weight. Three weight percent of the catalyst AIBN is employed. Also, the solvent benzene is employed. The copolymer produced in the benzene is one which has a glass transition temperature of 58° C. and a molecular weight of 4000.

A quantity of 5.3 parts of azelaic acid is dissolved in 41 parts of methanol in order to produce a dicarboxylic acid solution. The dicarboxylic acid solution is added to a solution which contains 233 parts benzene and 100 parts by weight of the copolymer produced as described above. A powder coating composition is produced and applied to panels in accordance with the procedure outlined in Example 1. The quality of the painted panels obtained after application of the powder coating to various materials is about the same as achieved in Example 1.

Example 3

A monomer mixture having the following composition is prepared: glycidyl methacrylate 12% by weight, methyl methacrylate 48% by weight, and butyl methacrylate 40% by weight. The monomer mixture is processed in the same manner as described in Example 1 with 3% by weight of the catalyst AIBN employed and with toluene as the solvent. The resulting copolymer has a glass transition temperature of 56° C. and a molecular weight of 4000.

A dicarboxylic acid solution is prepared as described in Example 1 except that 8.0 parts by weight of azelaic acid are used with 58 parts ethanol. This dicarboxylic acid solution is mixed with a solution containing 233 parts by weight toluene and 100 parts by weight of the copolymer.

The other materials required for the powder coating composition are added as described in Example 1 and a powder coating composition prepared therefrom as described in Example 1. The powder coating is applied to test panels in the same manner as described in Example 1. The coated panels are baked at a temperature of 170° C. for 30 minutes. The coating obtained has good adhesion to the steel, glass, brass, zinc, aluminum, copper and bronze test panels.

Example 4

A monomer mixture having the following composition is prepared: glycidyl methacrylate 20% by weight, methyl methacrylate 40% by weight and butyl methacrylate 40% by weight. A copolymer is formed from this monomer mixture in accordance with the same procedure as is outlined in Example 1. In this case, 1% by weight of the catalyst AIBN is added and the solvent for the copolymer is xylene. The copolymer produced has a glass transition temperature of 51° C. and a molecular weight of 8500.

A dicarboxylic acid solution is formed by mixing 10.3 parts by weight of adipic acid with 155 parts ethanol. After the dicarboxylic acid solution is formed, 0.1 parts by weight tetrabutyl ammonium chloride, 4 parts polybutyl acrylate ($\overline{M}_n=9,000$), 15 parts titanium dioxide, and 10 parts ultra marine blue are mixed with the dicarboxylic acid solution. The dicarboxylic acid solution containing the mentioned materials is added to a solution containing 100 parts by weight of the copolymer and 233 parts xylene. The above mixture is thoroughly mixed and the solvents evaporated therefrom as described in Example 1. A powder is prepared from the dry product as described in Example 1 and applied to test panels in the same manner as described in the example. The powder coating obtained on each test panel after curing of the powder coating composition at a temperature of 200° C. for 10 minutes is of good quality, and is solvent and scratch resistant.

Example 5

A monomer mixture having the following composition is prepared: glycidyl methacrylate 20% by weight, methyl methacrylate 45% by weight and butyl methacrylate 35% by weight. The monomers are reacted as described in Example 1 to produce a copolymer. In this case, 5% by weight of the catalyst AIBN is employed and toluene is the solvent. The resulting copolymer has a glass transition temperature of 53° C. and a molecular weight of 3000.

A dicarboxylic acid solution is prepared by mixing 14.2 parts by weight of pimelic acid and 125 parts propanol. A copolymer solution containing 100 parts by weight of the copolymer produced as described in this example with 233 parts of toluene has the following materials added thereto: 2 methyl-2,4-ethylimidazole 0.05 parts by weight, dibutyl poly(2-ethyleneoxy) phosphate 0.05 parts, polyisododecylmethacrylate 4 parts, titanium dioxide 10 parts, and phthalocyanine blue 7 parts. These materials are thoroughly mixed with the copolymer solution and then the copolymer solution is mixed with the dicarboxylic acid solution.

The final solution is heated to 60° C. and dried by continuous injection under high pressure (150 p.s.i.) into a vacuum chamber maintained at 60° C. and 10 mm. Hg pressure. The pressurized solution entering the vacuum chamber breaks into small droplets and the solvents evaporate rapidly yielding dry particles which are collected at the bottom of the chamber. The particles are sieved through 140 mesh screen to give powder coating composition which is applied to test panels. The coatings obtained on the various test panels are of good quality with respect to their adhesion, appearance, and impact characteristics.

Example 6

A monomer mixture having the following composition is prepared: glycidyl methacrylate 15% by weight, butyl acrylate 20% by weight and methyl methacrylate 65% by weight. The monomer mixture is reacted as set forth in Example 1 in order to produce a copolymer. Four percent by weight of the catalyst AIBN is employed in reacting the monomer mixture to form the copolymer and toluene is the solvent. The copolymer produced has a glass transition temperature of 65° C. and a molecular weight of 3000.

A dicarboxylic acid solution is prepared by mixing 9.3 parts by weight suberic acid with 58 parts of isopropanol. The dicarboxylic acid solution is mixed with the polymer solution containing 100 parts by weight of the copolymer and 233 parts toluene. After the two solutions are thoroughly mixed, the following additional materials are added thereto and mixed as described in Example 1: triethylene diamine 0.1 parts by weight, tetraethylammonium chloride .05 parts, polylaurylmethacrylate ($\overline{M}_n=6000$) 2 parts, phthaloycanine green 7 parts, and titanium dioxide 10 parts.

The above described mixture is thoroughly mixed and processed as described in Example 1 to produce a powder coating composition. The powder coating composition is applied to test panels as described in Example 1 and baked on the panels at a temperature of 150° C. for 15 minutes.

The coating obtained has good adhesion to steel, glass, brass, zinc, aluminum, copper and bronze and is insoluble in toluene, gasoline, methanol and butanone.

Example 7

A monomer mixture having the following composition is prepared: glycidyl methacrylate 15% by weight, methyl methacrylate 50% by weight and styrene 35% by weight. The monomers are reacted in toluene in accordance with the procedure set forth in Example 1 with 3% by weight of the catalyst AIBN being utilized. The resulting copolymer, in solution, has a molecular weight of 4500 and a glass transition temperature of 90° C.

A dicarboxylic acid solution is prepared by mixing 10.8 parts by weight of sebacic acid with 155 parts isopropanol. The dicarboxylic acid solution is added to a copolymer solution containing 100 parts by weight copolymer and 233 parts toluene. The two solutions are thoroughly mixed with one another and the following materials are added and mixed therewith: tetramethylammonium chloride 1 part by weight, poly(2-ethylhexyl acrylate) 2 parts, ferrite yellow 7 parts, and titanium dioxide 10 parts.

The solution achieved is mixed and dried as described in Example 5. The powder coating composition is applied to test panels as described in Example 1. The panels are baked at a temperature of 180° C. for 5 minutes. The adhesion quality of the powder coating after baking on the various test panels is good. The coating on each panel possesses good solvent and scratch resistance.

Example 8

A monomer mixture having the following composition is formed: glycidyl methacrylate 18% by weight, ethyl acrylate 20% by weight, methyl methacrylate 40% by weight, vinyl chloride 22% by weight. The monomer mixture is polymerized in benzene by using 2 weight percent of the catalyst AIBN as the initiator.

A dicarboxylic acid solution is formed by dissolving 16.4 parts by weight of tetradecandioc acid in 125 parts butanol. The acid solution is mixed with a copolymer solution containing 100 parts by weight of the copolymer and 233 parts benzene. These two solutions are uniformly mixed and the following materials are added and thoroughly mixed therewith: 0.1 part by weight trimethyl benzyl ammonium chloride, 2 parts poly (2-ethylhexyl acrylate ($\overline{M}_n=11,000$), and 6 parts carbon black.

The above described solution has the solvents thereof evaporated as described in Example 5. The resulting powder is applied to test panels as described in Example 1. The coatings on the panels are baked at 170° C. for 15 minutes. All the painted panels exhibit good adhesion and solvent resistance properties.

Example 9

A monomer mixture having the following composition is formed: glycidyl methacrylate 15% by weight, methyl methacrylate 30% by weight, isobutyl acrylate 25% by weight, alpha methyl styrene 15% by weight and methacrylonitrile 15% by weight. This monomer mixture is reacted in the same manner as described in Example 1 with the exception that xylene is used as the solvent. Three percent of the catalyst AIBN is employed. The resulting copolymer, in solution, has a glass transition temperature of 46° C. and a molecular weight of 4500.

By weight, 78 parts butanol is added to a copolymer solution containing 100 parts of the copolymer and 233 parts xylene. Once the solution is formed, 13 parts by weight of brassylic acid is added to the solution and thoroughly mixed therewith. The following materials are added to the solution and thoroughly mixed therewith: dodecyldimethyl (2-phenoxyethyl) ammonium bromide 0.5 part by weight, polyethylene glycol perfluoro octonoate 2 parts, and black iron oxide 10 parts.

The solution described above is thoroughly mixed and the solvent removed therefrom as described in Example 1. The resulting powder is crushed and formed into a powder coating composition and applied to test panels as described in Example 1. The coated panels are baked at 165° C. for 15 minutes. The coating on each panel has good adhesion and solvent resistance.

Example 10

A monomer mixture is formed having the following composition: glycidyl methacrylate 12% by weight, methyl methacrylate 50% by weight, 2-ethylhexyl acrylate 10% by weight and acrylonitrile 28% by weight. The monomer mixture is processed in toluene as set forth in Example 1 in order to form a copolymer. Four percent by weight of the catalyst AIBN is added. The copolymer, in solution, has a glass transition temperature of 60° C. and a molecular weight of 4000.

A dicarboxylic acid solution is formed by dissolving 27.8 parts by weight of nondecandioc acid in 78 parts isobutanol. The dicarboxylic acid solution is thoroughly mixed with the copolymer solution containing 100 parts by weight of the copolymer and 233 parts toluene. The two solution are thoroughly mixed with one another and the following materials are mixed therewith: 0.5 parts by weight stannous octoate, 0.05 part tetraethylammonium bromide, 2 parts polyethylene glycol perfluoro octonate, 5 parts qundo red, and 15 parts titanium dioxide. The above described materials are mixed, the solvents evaporated therefrom, a powder coating composition prepared and applied to test panels as described in Example 1. The panels are baked at 150° C. for 20 minutes. The adhesion to the panels of the powder coating is good and each coating possesses good solvent resistance.

Example 11

A monomer mixture having the following composition is prepared: glycidyl methacrylate 22% by weight, n-hexyl methacrylate 20% by weight, butyl methacrylate 25% by weight and acrylonitrile 33% by weight. A copolymer is formed in toluene from this monomer mixture in accordance with the same procedure as is outlined in Example 1. In this case, 1.5% by weight of the catalyst AIBN is added. The copolymer, in solution, has a glass transition temperature of 40° C. and a molecular weight of 7500.

A dicarboxylic acid solution is formed by dissolving 27.2 parts by weight of docosandioc acid in 190 parts isobutanol. The acid solution is mixed with a copolymer solution containing 100 parts by weight of the copolymer and 233 parts toluene. The two solutions are thoroughly mixed with one another and the following materials are added and mixed therewith: zinc octoate 0.8 parts by weight, tetrabutyl ammonium iodide 1.0 parts, polybutyl acrylate 2.0 parts, and iron oxide transparent orange 10 parts. All of the materials are mixed with one another, the solvents evaporated, a powder coating composition prepared and applied to test panels as described in Example 1. The coating obtained on each of the test panels after curing of the powder coating composition at a temperature of 140° C. for 20 minutes is of good quality, and is solvent and scratch resistant.

Example 12

A monomer mixture having the following composition is prepared: glycidyl methacrylate 10% by weight, methyl methacrylate 45% by weight, butyl methacrylate 35% by weight and vinyl acetate 10% by weight. A copolymer is formed in toluene from this monomer mixture in accordance with the same procedure as is outlined in Example 1. In this case, 3% by weight of the catalyst AIBN is added.

A dicarboxylic acid solution is formed by dissolving 5.0 parts by weight of adipic acid in 100 parts isobutanol. The acid solution is added to 333 parts copolymer solution containing 100 parts by weight of the copolymer and 233 parts toluene. These materials are mixed with one another and the following materials are added and mixed: tetrabutylammonium bromide 2 parts by weight, poly (2-ethylhexyl acrylate) 3.5 parts, and carbon black 6 parts. The above described materials are mixed with one another, the solvents evaporated therefrom, a powder coating composition prepared and applied to test panels as described in Example 1. The coating obtained on each of the test panels after curing of the powder coating composition at a temperatuer of 160° C. for 10 minutes is of good quality. Also, the coating obtained on each test panel is insoluble in toluene, gasoline, methanol and butanone.

Example 13

A monomer mixture having the following composition is prepared: glycidyl methacrylate 8% by weight, methyl methacrylate 52% by weight and isobutyl methacrylate 40% by weight. A copolymer is formed from this monomer mixture in accordance with the same procedure as is outlined in Example 1 with toluene acting as the solvent. In this case, 5% by weight of the catalyst AIBN is added. The copolymer produced, in solution, has a glass transition temperature of 75° C. and a molecular weight of 3200.

A dicarboxylic acid solution is formed by dissolving 3.7 parts by weight succinic acid in 100 parts sec-butyl alcohol. This acid solution is added to a solution containing 100 parts by weight of the copolymer and 233 parts toluene. To these two solutions is added the following materials which are then mixed with one another: 2 parts by weight tetrabutylammonium bromide, 4 parts polyauryl acrylate, and 30 parts titanium dioxide. All of the above materials are mixed, the solvents evaporated therefrom, a powder coating composition prepared and applied as described in Example 1. The coating obtained on each test panel after curing of the powder coating composition at a temperature of 130° C. for 10 minutes is of good quality and is solvent and scratch resistant.

Example 14

A monomer mixture having the following composition is prepared: glycidyl acrylate 10% by weight, methyl methacrylate 67% by weight, and n-butyl methacrylate 23% by weight. A copolymer is formed in benzene from this monomer mixture in accordance with the procedure as is outlined in Example 1. In this case, 4% by weight of the catalyst AIBN is added. The copolymer produced, in solution, has a glass transition temperature of 73° C. and a molecular weight of 3000.

A dicarboxylic acid solution is formed by dissolving 8.6 parts by weight of undecandoic acid in 155 parts sec-butyl alcohol. To the acid solution is added 0.7 part by weight tetrabutylammonium chloride, 2 parts polybutyl acrylate, and 30 parts titanium dioxide. The acid solution containing the materials is added to a copolymer solution containing 100 parts by weight of the copolymer and 233 parts benzene. All of these materials are mixed, the solvents evaporated therefrom, a powder coating composition prepared and applied to test panels as described in Example 1. The coating obtained on each test panel after curing of the powder coating composition at a temperature of 180° C. for 15 minutes is of good quality. Also, each of the test panel coatings is resistant too and insoluble in toluene, gasoline, methanol and butanone.

Example 15

A monomer mixture having the following composition is prepared: glycidyl methacrylate 15% by weight, methyl methacrylate 32% by weight, ethyl acrylate 15% by weight, isobutyl acrylate 8% by weight and styrene 30% by weight. A copolymer is formed in xylene from this monomer mixture in accordance with the same procedure as is outlined in Example 1. In this case, 3% by weight of the catalyst AIBN is added.

A copolymer solution is formed containing 100 parts by weight of the copolymer and 233 parts xylene. To this copolymer solution is added: 1 part by weight tetraethyl ammonium bromide, 1.5 parts polyisodecyl methacrylate ($M_n$=5000), and 30 parts titanium dioxide. A dicarboxylic solution is formed by mixing 6.6 parts by weight gluraric acid and 233 parts sec-butyl alcohol. The acid solution is mixed with the copolymer solution containing the other materials and the materials are mixed, the solvents evaporated therefrom, a powder coating composition prepared and applied to test panels as described in Example 1. The coatings obtained on each test panel after curing of the powder coating composition at a temperature of 140° C. for 15 minutes is of good quality and has good adhesion characteristics.

Example 16

A monomer mixture having the following composition is prepared: glycidyl acrylate 15% by weight, methyl methacrylate 40% by weight, 2-ethylhexyl acrylate 15% by weight, alpha methyl styrene 20% by weight and acrylonitrile 10% by weight. A copolymer is formed in xylene from this monomer mixture using 4% by weight of the catalyst AIBN.

A copolymer solution is formed containing 100 parts by weight of the copolymer and 233 parts xylene. To this copolymer solution is added 100 parts by weight tertiary butyl alcohol, 0.4 part tetraethylammonium bromide, 2 parts poly(2-ethylhexyl acrylate), and 30 parts titanium dioxide. All of these materials are dispersed in one another. Thereafter, 7.7 parts by weight of adipic acid is added to the solution. All of these materials are mixed, the solvents evaporated therefrom, a powder coating composition prepared and applied as described in accordance with the procedure outlined in Example 1. The powder coating obtained on each test panel after curing of the powder coating composition at a temperature of 170° C. for 20 minutes is of good quality and is resistant to the aforementioned solvents.

Example 17

A monomer mixture having the following composition is prepared: glycidyl acrylate 20% by weight, butyl acrylate 40% by weight, methyl methacrylate 10% by weight and styrene 30% by weight. A copolymer is formed in toluene from this monomer mixture in accordance with the same procedure as is outlined in Example 1. In this case, 4% by weight of the catalyst AIBN is added. The copolymer produced has a glass transition temperature of 40° C. and a molecular weight of 3000.

A dicarboxylic acid solution is prepared by dissolving 13.4 parts by weight of azelaic acid in 155 parts tertiary butyl alcohol. The dicarboxylic acid solution is added to a copolymer solution containing 100 parts by weight of the copolymer and 233 parts toluene.

The two solutions are mixed together and the following materials are added and mixed therewith: 0.5 part tetraethylammonium bromide, 1.0 part polylauryl acrylate, and 30 parts titanium dioxide. All of the materials are mixed together, the solvents evaporated therefrom, a powder coating composition prepared and applied as described in Example 1. The coating obtained on each test panel after curing of the powder coating composition at a temperature of 180° C. for 10 minutes is of good quality and is resistant to the aforementioned solvents.

Example 18

A monomer mixture having the following composition is prepared: glycidyl acrylate 15% by weight, butyl methacrylate 15% by weight, ethyl acrylate 15% by weight, methyl methacrylate 30% by weight and styrene 25% by weight. A copolymer is formed in toluene from this monomer mixture in accordance with the same procedure as is outlined in Example 1. In this case, 4% by weight of the catalyst AIBN is added.

A dicarboxylic acid solution is prepared by dissolving 8.0 parts by weight of azelaic acid in 78 parts propanol. This acid solution is added to a copolymer solution containing 100 parts by weight of the copolymer and 233 parts toluene. To these two solutions is added: 1.0 part by weight tetraethyl ammonium bromide, 0.5 part polylauryl acrylate, and 30 parts titanium dioxide. All of these materials are mixed with one another, the solvents evaporated therefrom, a powder coating composition prepared and applied to test panels as described in Example 1. The coatings obtained on all of the test panels after the coating composition has been baked at a temperature of 130° C. for 30 minutes is of good quality and resistant to the aforementioned solvents.

Example 19

A monomer mixture having the following composition is prepared: glycidyl acrylate 15% by weight, 2-ethylhexyl acrylate 10% by weight, methyl methacrylate 50% by weight, methacrylonitrile 15% by weight and alpha methyl styrene 10% by weight. A copolymer is formed in toluene from this monomer mixture in accordance with the same procedure as is outline in Example 1. In this case, 4% by weight of the catalyst AIBN is added.

A dicarboxylic acid solution is prepared by dissolving 11.1 parts by weight of azelaic acid in 100 parts by weight isopropanol. The dicarboxylic acid solution is added to a copolymer solution containing 100 parts by weight copolymer and 233 parts toluene. The two solutions are mixed together and the following materials are added and mixed therewith: 0.5 part by weight tetraethylammonium bromide, 2.5 parts polylauryl acrylate, and 30 parts titanium dioxide. All of the above mentioned materials are thoroughly mixed with one another, the solvents evaporated therefrom, a powder coating composition prepared and applied as described in the procedure of Example 1. The coating obtained on each test panel after curing of the powder coating composition at a temperature of 135° C. for 30 minutes is of good quality. The coatings are resistant to and insoluble in toluene, gasoline, methanol and butanone.

There has been disclosed herein a method of manufacturing a powder coating composition in which the coating compositions are formulated in solutions. Many modifications of the methods of this invention will be apparent to those skilled in the art in view of this specification. It is intended that all such modifications which fall within the true spirit and scope of this invention be included within the appended claims.

What we claim is:

1. A method of making a powder coating composition containing as the principal constituents thereof: (a) a copolymer of glycidyl acrylate or glycidyl methacrylate and an ethylenically unsaturated compound in such proportions as to obtain a copolymer with a glass transition temperature in the range of 40° C. to 90° C. and a molecular weight ($\overline{M_n}$) in the range of 2500 to 8500, said glycidyl acrylate or glycidyl methacrylate being present in said copolymer from at least 8% by weight to no more than 25% by weight, (b) a saturated, straight chain, aliphatic, dicarboxylic acid containing 4–20 carbon atoms per molecule in the amount of 0.8 to 1.1 carboxylic groups for each epoxy group in said copolymer, and (c) other suitable materials for such a composition including a pigment, a flow control agent, a catalyst and such; which method comprises the steps of:

preparing a solution of said copolymer in a suitable solvent, said copolymer solution containing 30% to 50% by weight of said copolymer;

preparing a solution of dicarboxylic acid in an alcohol having a boiling point in the range of 60° C. to 120° C.; said alcohol being present in said dicarboxylic acid solution in a range from 15% to 50% by weight of the total solvents in both said copolymer solution and said dicarboxylic acid solution.

mixing said copolymer solution with said dicarboxylic acid solution to form an inermediate solution;

mixing said other suitable materials with said intermediate solution to form a final solution; and evaporating said solvents from said final solution to produce a powder coating composition.

2. The method of making a powder coating composition as defined in claim 1 wherein: said solvent for said copolymer is selected from the group consisting essentially of benzene, toluene and xylene; and wherein said alcohol is selected from the group consisting essentially of methanol, ethanol, propanol, iso-propanol, butanol, iso-butanol, sec-butyl alcohol, and tert-butyl alcohol.

3. The method of making a powder coating composition as defined in claim 1 wherein: said other suitable materials are mixed with said dicarboxylic acid solution prior to mixing it with said copolymer solution.

4. The method of making a powder coating composition as defined in claim 1 wherein: said other suitable materials materials are mixed with said copolymer solution prior to the mixing of said dicarboxylic acid solution and said copolymer solution.

References Cited
UNITED STATES PATENTS

| | | | |
|---|---|---|---|
| 3,222,419 | 12/1965 | Jubilee | 260—836 |
| 3,070,564 | 12/1962 | Roeser | 260—836 |
| 3,423,481 | 1/1969 | Mizutani | 260—836 |
| 3,595,944 | 7/1971 | Manning | 260—836 |

PAUL LIEBERMAN, Primary Examiner

U.S. Cl. X.R.

117—124 E, 132 BE; 260—37 Ep, 41 B, 830 R, DIG. 16, 17, 19

UNITED STATES PATENT OFFICE
CERTIFICATE OF CORRECTION

Patent No. 3,787,521   Dated January 22, 1974

Inventor(s) Santokh S. Labana and Amos Golovoy

It is certified that error appears in the above-identified patent and that said Letters Patent are hereby corrected as shown below:

[9] Application Filing Date should read --February 22, 1972--.

Signed and sealed this 16th day of July 1974.

(SEAL)
Attest:

McCOY M. GIBSON, JR.
Attesting Officer

C. MARSHALL DANN
Commissioner of Patents